US012766700B2

(12) United States Patent
Yokoyama

(10) Patent No.: US 12,766,700 B2
(45) Date of Patent: Oct. 20, 2026

(54) WELDING ROBOT AND TEACHING HANDLE

(71) Applicant: DAIHEN CORPORATION, Osaka (JP)

(72) Inventor: Yuta Yokoyama, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 65 days.

(21) Appl. No.: 18/931,301

(22) Filed: Oct. 30, 2024

(65) Prior Publication Data

US 2025/0162133 A1 May 22, 2025

(30) Foreign Application Priority Data

Nov. 21, 2023 (JP) ................................ 2023-197253

(51) Int. Cl.
*B25J 9/00* (2006.01)
*B25J 9/16* (2006.01)
(Continued)

(52) U.S. Cl.
CPC ........... *B25J 9/0081* (2013.01); *B25J 9/1664* (2013.01); *B25J 11/005* (2013.01); *B25J 13/02* (2013.01); *B25J 15/0019* (2013.01); *B25J 15/04* (2013.01); *G05B 19/423* (2013.01); *G05B 2219/36401* (2013.01); *G05B 2219/45104* (2013.01)

(58) Field of Classification Search
CPC ........ B25J 13/02; B25J 13/025; B25J 13/085; B25J 9/0081; G05B 19/423; G05B 19/427; G05B 2219/39409; G05B 2219/39427; G05B 2219/39529; G05B 2219/36401
See application file for complete search history.

(56) References Cited

U.S. PATENT DOCUMENTS

| | | | |
|---|---|---|---|
| 6,385,508 | B1 | 5/2002 | McGee et al. |
| 2001/0025837 | A1 | 10/2001 | Zamuner |

(Continued)

FOREIGN PATENT DOCUMENTS

| | | | |
|---|---|---|---|
| CN | 214640914 | U | 11/2021 |
| CN | 114466724 | A | 5/2022 |

(Continued)

OTHER PUBLICATIONS

Taiwanese Language Office Action issued in Taiwanese Application No. 113139398, dated Jul. 24, 2025 (8 pages).

(Continued)

*Primary Examiner* — Spencer D Patton
(74) *Attorney, Agent, or Firm* — Crowell & Moring LLP

(57) ABSTRACT

A teaching handle is mounted to a welding torch such that a handle distal end is disposed at a position facing a bending portion. The teaching handle extends in a direction away from a second portion of a torch body from the bending portion to a torch distal end, with a first torch virtual line along a first portion of the torch body from a torch proximal end to the bending portion interposed therebetween. A handle mounting angle is an obtuse angle, which is formed between a second torch virtual line along the second portion of the torch body from the bending portion to the torch distal end and a first handle virtual line along a direction in which the teaching handle extends from the handle distal end.

5 Claims, 8 Drawing Sheets

(51) Int. Cl.

| | |
|---|---|
| ***B25J 11/00*** | (2006.01) |
| ***B25J 13/02*** | (2006.01) |
| ***B25J 15/00*** | (2006.01) |
| ***B25J 15/04*** | (2006.01) |
| ***G05B 19/423*** | (2006.01) |

(56) References Cited

U.S. PATENT DOCUMENTS

| | | | | |
|---|---|---|---|---|
| 2015/0290809 | A1 | 10/2015 | Nakagawa et al. | |
| 2023/0027368 | A1 * | 1/2023 | Foucault | B25J 9/0081 |
| 2024/0009858 | A1 | 1/2024 | Inoue et al. | |

FOREIGN PATENT DOCUMENTS

| | | | | |
|---|---|---|---|---|
| CN | 116472147 | A | | 7/2023 |
| JP | 55133872 | A | * | 10/1980 |
| JP | S55-133872 | A | | 10/1980 |
| JP | 58143065 | U | * | 9/1983 |
| JP | S58-143065 | U | | 9/1983 |
| JP | 58-160666 | U | | 10/1983 |
| JP | H0376664 | U | | 7/1991 |
| JP | 2015-199174 | | | 11/2015 |
| KR | 20-1991-0008773 | | | 6/1991 |
| KR | 10-0729441 | B1 | | 6/2007 |
| WO | WO 2022/138596 | A1 | | 6/2022 |

OTHER PUBLICATIONS

Extended European Search Report issued in European Application No. 24208054.7 dated Mar. 26, 2025 (9 pages).

Office Action issued in Taiwanese Application No. 113139398, dated Jul. 24, 2025 (In English and Taiwanese) (17 pages).

* cited by examiner

WELDING ROBOT AND TEACHING HANDLE

RELATED APPLICATIONS

The present application claims priority from Japanese patent application JP 2023-197253 filed on Nov. 21, 2023, the entire content of which is hereby incorporated by reference into this application.

BACKGROUND OF THE INVENTION

1. Field of the Invention

The present invention relates to a welding robot and a teaching handle.

2. Description of the Related Art

In recent years, human cooperative type robots configured to operate in close proximity to workers have been developed. For example, JP 2015-199174 A proposes a robot in which an end of a robot body is provided with a hand configured to hold a component. In this robot, a teaching handle configured to teach behaviors of the robot is mounted to an end of the robot body. The teaching handle is used when teaching the behavior of the robot body according the position to which the hand moves by an external force (operating force) applied to the end of the robot body from an operator while the teaching handle is held by the operator.

SUMMARY OF THE INVENTION

However, when such a robot having the teaching handle mounted thereon is used as a welding robot, the teaching handle, which is mounted to the end of the robot, is located away from a torch body of a welding torch. This means that, even when the teaching handle is used, it is difficult to teach a behavior similar to the behavior of the worker performing welding to the robot body and to make the welding robot accurately perform welding.

The present invention has been made in view of the foregoing, and provides a welding robot and a teaching handle that can teach a behavior similar to the behavior of the worker performing welding to an articulated robot.

In view of the above-described problem, the welding robot according to the present invention is a welding robot comprising: a robot body with multiple joints; and a welding torch attached to an end of the robot body. The welding torch includes a torch body and a coupling portion that couples the torch body to the end of the robot body. The torch body includes a bending portion between a torch proximal end of the torch body and a torch distal end of the torch body, the bending portion being a bent portion of the torch body. The welding robot further includes a teaching handle configured to teach a behavior of the robot body according to a position to which the torch distal end moves by an external force applied to the end of the robot body from an operator while the teaching handle is held by the operator. The teaching handle is mounted to the welding torch such that a handle distal end is disposed at a position facing the bending portion. In side view of the torch body and the teaching handle, with a first torch virtual line along a first portion of the torch body from the torch proximal end to the bending portion interposed therebetween, the teaching handle extends in a direction away from a second portion of the torch body from the bending portion to the torch distal end. A handle mounting angle is an obtuse angle, the handle mounting angle being formed between a second torch virtual line along the second portion of the torch body from the bending portion to the torch distal end and a first handle virtual line along a direction in which the teaching handle extends from the handle distal end.

According to the present invention, in a state where the operator is holding the teaching handle, it is possible to apply an external force from the teaching handle to the end of the robot body and teach the behavior of the robot body according to the position to which the torch distal end moves. In the present invention, the teaching handle is mounted to the welding torch such that the handle distal end is disposed at a position facing the bending portion, and, with the first torch virtual line interposed therebetween, the teaching handle extends in a direction away from the second portion of the torch body from the bending portion to the torch distal end. Accordingly, in the teaching operation, the operator holds the teaching handle such that the handle distal end is located on the front side of the operator and moves the handle distal end of the holding teaching handle, whereby the torch distal end of the torch body can be moved precisely and smoothly.

Since the handle mounting angle formed between the second torch virtual line and the first handle virtual line is an obtuse angle, the arrangement of the torch body and the teaching handle is close to the arrangement of a handle type welding torch and a handle. Thus, it is possible to teach a behavior similar to the behavior of the worker performing welding to the robot body. In particular, when the handle mounting angle is in a range from 110° to 140°, such an effect can be produced more readily.

In a more preferred aspect, in side view of the teaching handle, the teaching handle is curved downward.

According to this aspect, since the teaching handle is curved downward, the operator can easily hold the teaching handle and the operability of the teaching handle can be improved.

In a more preferred aspect, the teaching handle comprises: a handle body extending from a position facing the bending portion; and a raised portion for a finger hook over which fingers of an operator are placed in a state where the operator holds the teaching handle, the raised portion being raised from a lower part of the handle body. The raised portion has a height from the handle body that becomes smaller from a handle distal end side toward a handle proximal end side.

According to this aspect, with the raised portion, over which the fingers of the operator, from the middle finger to the little finger, are placed, the holding property of the teaching handle can be improved. Thus, the operability of the teaching handle can further be improved.

In a more preferred aspect, the teaching handle includes an operation switch configured to allow movableness of the robot body by the external force with respect to the robot body with restricted movableness, and the operation switch is disposed on an end face of the surface of the raised portion nearer to the handle distal end.

According to this aspect, since the operation switch is disposed on the end face of the surface of the raised portion nearer to the handle distal end, the operator can press the operation switch with the index finger while placing the fingers from the middle finger to the little finger over the raised portion.

In a more preferred aspect, the teaching handle is used for the above-described welding robot. The teaching handle is removably mounted to the welding torch.

According to this aspect, since the teaching handle is removably mounted to the welding torch, it is possible to remove the teaching handle, operate the robot body according to the behavior of the operator in teaching, and perform highly accurate welding.

According to the present invention, it is possible to teach a behavior similar to the behavior of the worker performing welding to an articulated robot.

DETAILED DESCRIPTION OF THE PREFERRED EMBODIMENTS

Referring to FIG. 1 to FIG. 8B, a welding robot 1 according to an embodiment of the present invention will be described.

1. Regarding the Welding Robot 1

Figure 1:
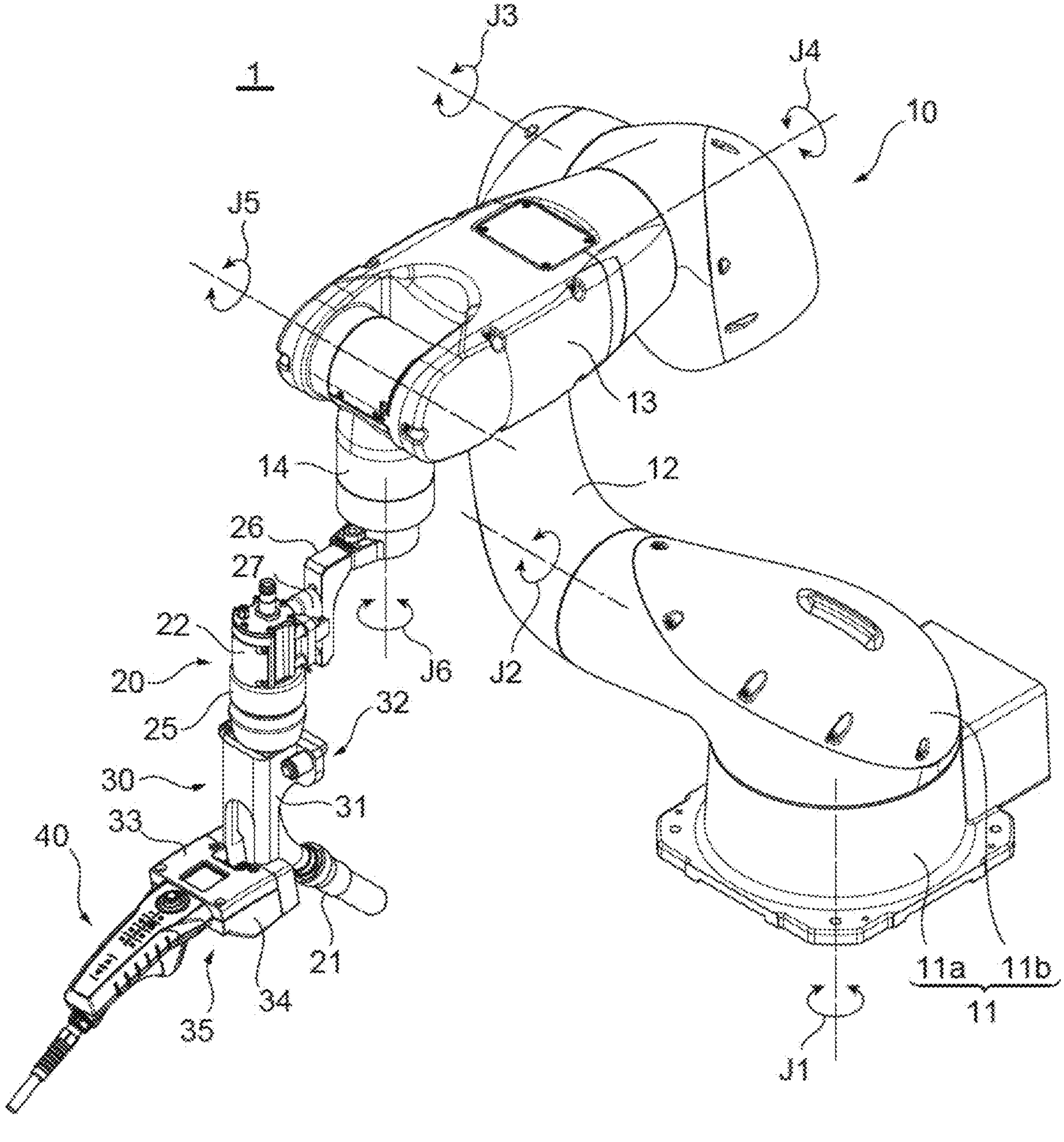
FIG. 1 is a schematic perspective view of a welding robot according to an embodiment of the present invention as viewed from the front side.
Figure 2:
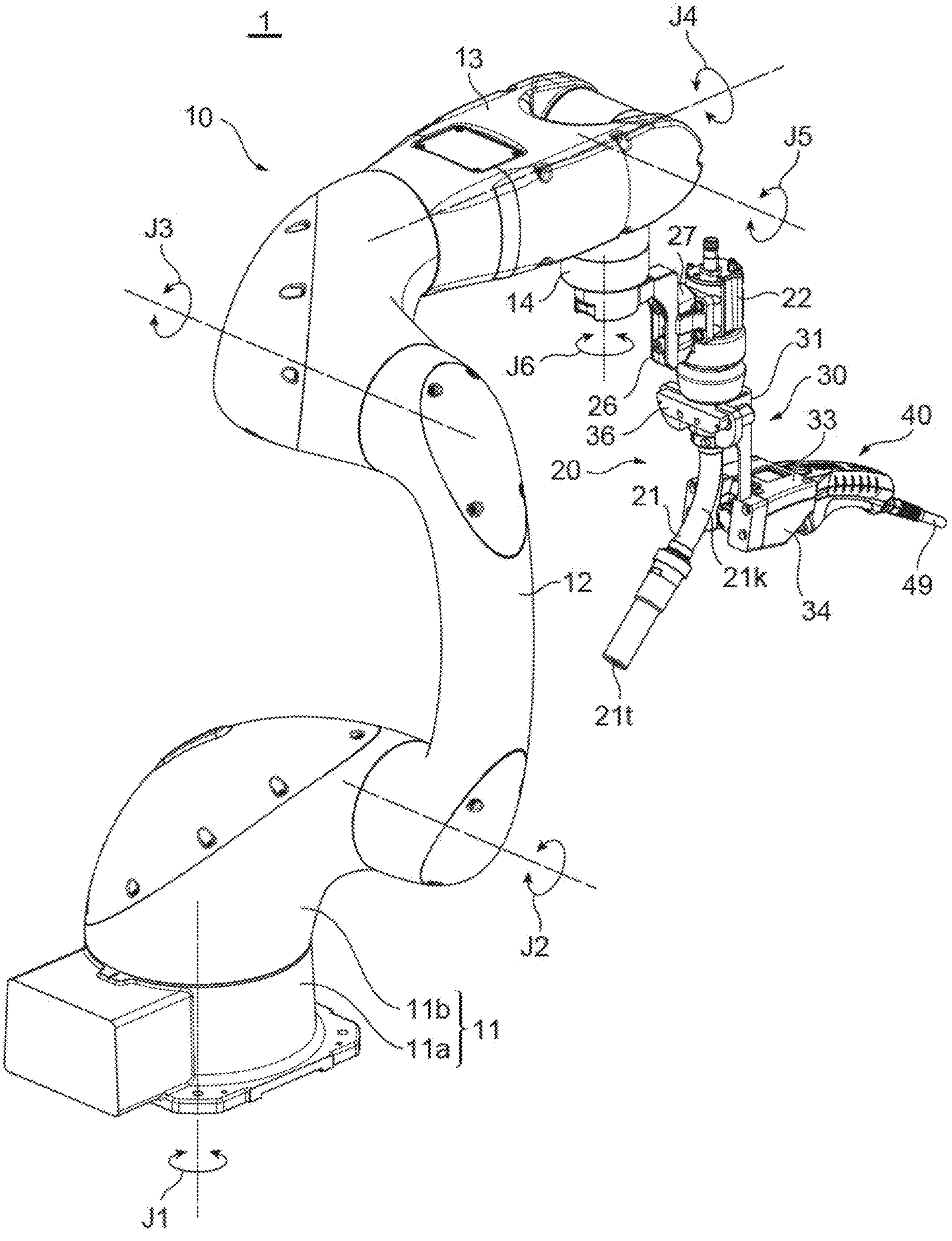
FIG. 2 is a perspective view of the welding robot illustrated in FIG. 1 as viewed from the rear side.

As illustrated in FIG. 1 and FIG. 2, the welding robot 1 includes a robot body 10 with multiple joints, a welding torch 20 that is attached to a support arm 14 at an end of the robot body 10, and a teaching handle 40 that is attached to the welding torch 20 via a bracket 30. The welding torch 20 corresponds to an end effector of the robot body 10.

In the present embodiment, the welding robot 1 is a human cooperative type robot configured to behave near a worker. Specifically, the welding robot 1 has a direct teaching function in which an operator as the worker teaches a welding operation. Specifically, the direct teaching function is a function that teaches a welding behavior to the robot body 10 while a posture of the robot body 10 is changed by directly applying an external force (an operating force) from an operator to an end of the robot body 10 via the teaching handle 40 in a state where the operator holds the teaching handle 40. In addition to this, the welding robot 1 has a function in which the worker performs manual welding using the teaching handle 40 before performing main welding by the welding robot 1.

2. Regarding the Robot Body 10

As illustrated in FIG. 1 and FIG. 2, the robot body 10 includes a base 11, and the base 11 is placed on a placement surface. The base 11 includes a fixed base 11*a* secured to the placement surface, and a turning base 11*b* that turns around a first axis J1 along a direction perpendicular to the placement surface.

An output shaft of a first motor (not illustrated) secured to the fixed base 11*a* is connected to the turning base 11*b*. Accordingly, by driving of the first motor, the turning base 11*b* can be turned around the first axis J1 with respect to the fixed base 11*a*. A first decelerator (not illustrated) is attached to the output shaft of the first motor, and a first torque sensor (not illustrated) that detects a torque around the first axis J1 is attached to an output shaft of the first decelerator. It is noted that the first motor, the first decelerator, and the first torque sensor are housed inside of the base 11.

The robot body 10 includes a lower arm 12, a proximal end of which is pivotally attached to the turning base 11*b*, an upper arm 13 that is pivotally attached to a distal end of the lower arm 12, and the support arm 14 that is pivotally attached to a distal end of the upper arm 13. These arms are made of metal, for example, a casting of cast iron or an aluminum alloy casting.

The proximal end of the lower arm 12 is axially supported by the turning base 11*b* of the base 11, and is pivotally attached to the turning base 11*b* so as to be turnable around a second axis J2 via a second motor (not illustrated). Here, the second axis J2 is an axis parallel to the direction perpendicular to the first axis J1. By the power of the second motor, the lower arm 12 turns around the second axis J2 with respect to the turning base 11*b*. A second decelerator (not illustrated) is attached to an output shaft of the second motor. A second torque sensor (not illustrated) that detects a torque around the second axis J2 is attached to an output shaft of the second decelerator, and the second torque sensor is fixed to the lower arm 12. The lower arm 12 has a cylindrical shape, and includes various cables (not illustrated) inserted therethrough.

The distal end of the lower arm 12 is axially supported by the upper arm 13, and the upper arm 13 is pivotally attached to the distal end of the lower arm 12 so as to be turnable around a third axis J3 parallel to the second axis J2 via a third motor (not illustrated). Inside of the upper arm 13, the third motor is secured to the upper arm 13. A third decelerator is attached to an output shaft of the third motor. Further, a third torque sensor that detects a torque around the third axis J3 is attached to an output shaft of the third decelerator, and the third torque sensor is secured to the lower arm 12.

The upper arm 13 corresponds to an arm portion of the robot body 10, and has the third motor and a fourth motor (not illustrated) housed therein. An output shaft of the fourth motor and an arm body of the upper arm 13 are connected via a power transmission belt or the like. A fourth torque sensor that detects a torque around a fourth axis J4 is attached to the arm body. The fourth torque sensor is secured to the arm body. By driving of the fourth motor, the upper arm 13 turns around the fourth axis J4 along the longitudinal direction of the arm body.

The distal end of the upper arm 13 is a portion that corresponds to a wrist portion of the robot body 10, and the support arm 14 for supporting the welding torch 20 is attached to the distal end of the upper arm 13. Specifically, the support arm 14 is pivotally attached to a distal end portion of the upper arm 13 so as to be turnable around a fifth axis J5 perpendicular to the fourth axis J4, and is turnable around a sixth axis J6 along the longitudinal direction.

The upper arm 13 includes a built-in fifth motor (not illustrated) that pivots the support arm 14 relative to the upper arm 13. The fifth motor is connected to the support arm 14 via a power transmission belt or the like built in the upper arm 13. Note that the fifth motor and the sixth motor (described later) are built in the upper arm 13. Thus, by the power of the fifth motor being transmitted to the power transmission belt built in the upper arm 13, the support arm 14 turns (swings) relative to the upper arm 13 around the fifth axis J5.

Furthermore, the upper arm 13 includes a built-in sixth motor (not illustrated), and the sixth motor is connected to the support arm 14 via the power transmission belt and a bevel gear (not illustrated). Thus, by driving of the sixth motor, a distal end portion (the main body portion) of the support arm 14 can be turned around an axial center (specifically, the sixth axis J6).

As described above, in the present embodiment, the robot body 10 includes the first to sixth motors for the driving around the respective axes of the first axis J1 to the sixth axis J6. The robot body 10 further includes the first to fourth torque sensors that measure a torque acting on each axis for only the respective axes of the first axis J1 to the fourth axis J4. The first to fourth torque sensors are a strain gauge type torque sensor.

Here, in the welding robot 1, while the torque around the fifth axis J5 and the sixth axis J6 may be measured by a torque sensor, for example, the torque may be estimated by a control device (not illustrated) from a current flowing through the fifth motor and the sixth motor.

The welding robot 1 includes the control device and a welding machine (not illustrated). The control device controls the behavior of the welding robot 1 by controlling the driving of the first to sixth motors. The control device performs the control of the welding robot 1 by performing (1) the control of the welding behavior of the robot body 10, (2) the control of a feeding speed of the feeding device that feeds a welding wire to the welding torch 20 that forms a welding machine body (not illustrated), (3) the control of an applied voltage for welding applied to the welding torch 20, (4) the control of a supply timing of a shield gas supplied to the welding torch 20, and the like. More specifically, as the control of the welding robot 1, the control device performs the control of the manual welding of the welding robot 1 for executing the welding such as a tack welding using the teaching handle 40 by an operator, the control of the teaching of the welding robot 1 for performing the teaching by an external operation (an operation by an external force) using the teaching handle 40, the control of automatic welding of the welding robot 1 in accordance with taught behavior, and the like.

3. Regarding the Welding Torch 20

The welding torch 20 includes a torch body 21 and a coupling portion 22 that couples the torch body 21 to the support arm 14 at the end of the robot body 10. The torch body 21 includes a bending portion 21*k* between a torch proximal end 21*p* of the torch body 21 and a torch distal end 21*t* of the torch body 21, the bending portion 21*k* being a bent portion of the torch body 21.

Specifically, in the torch body 21, a first portion 21*a* from the torch proximal end 21*p* to the bending portion 21*k* is formed along a first torch virtual line T1 that is a straight line. In the torch body 21, a second portion 21*b* from the bending portion 21*k* to the torch distal end 21*t* is formed along a second torch virtual line T2 that is a straight line. The first torch virtual line T1 and the second torch virtual line T2 respectively run through the axial center of the first portion 21*a* and the second portion 21*b* of the torch body 21. The angle formed between the first torch virtual line T1 and the second torch virtual line T2 is 135°, or is in a range from 120° to 150° in the present embodiment.

The torch body 21 includes a channel through which a welding wire is passed, a gas passage through which a shield gas is supplied, and the like. A nozzle is attached to the second portion 21*b* of the torch body 21. Since the torch body 21 has a typical structure, detailed description of the structure of the torch body 21 will be omitted. Further, the first portion 21*a* of the torch body 21 is connected to a connecting plug 21*c* at the torch proximal end 21*p* of the torch body 21. To the connecting plug 21*c*, a wire (not illustrated) for applying a welding voltage across the torch body 21, a pipe (not illustrated) for supplying a welding shield gas, and the like are connected.

Figure 5:
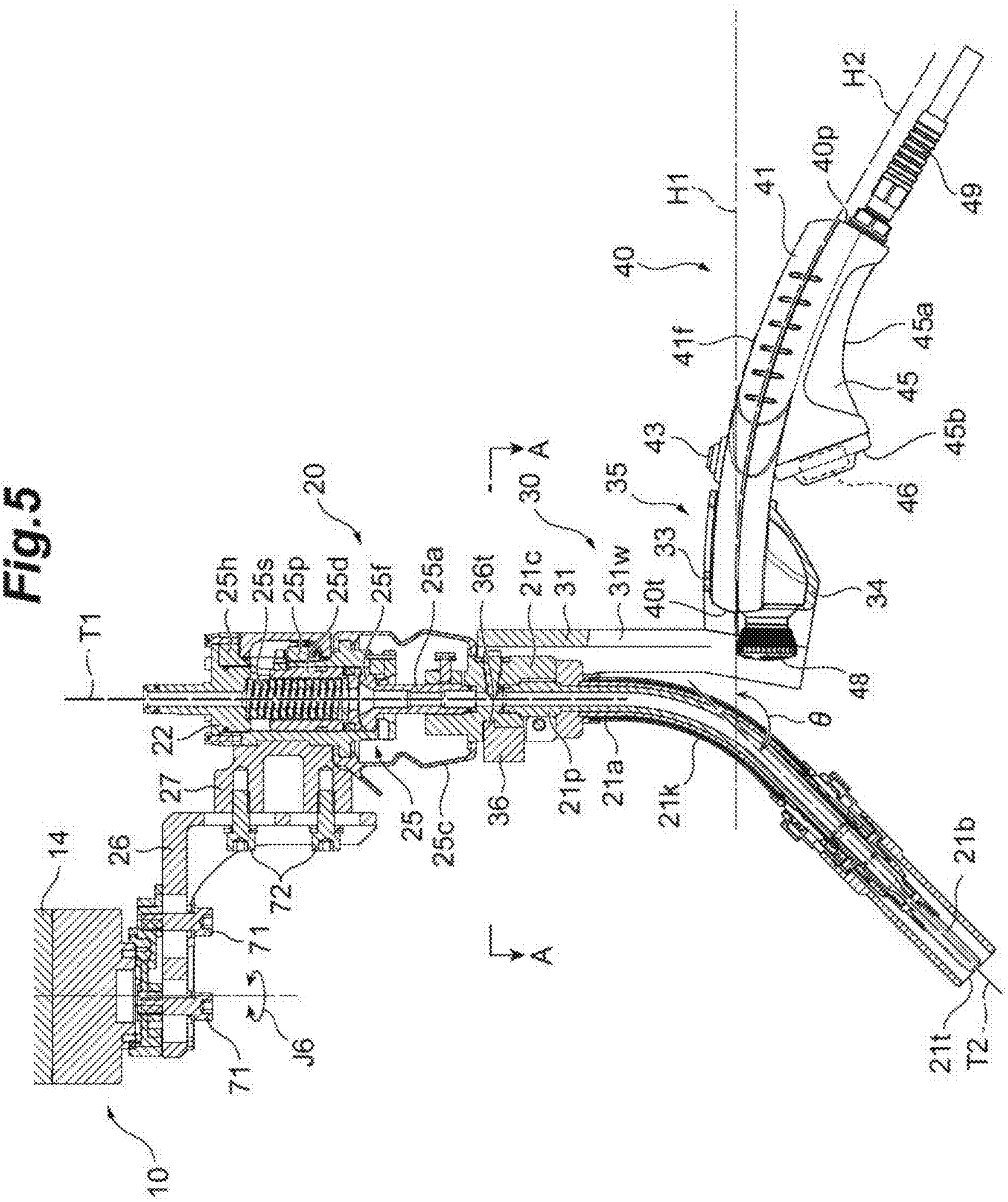
FIG. 5 is a partial cross-sectional view of the welding robot illustrated in FIG. 4.

As illustrated in FIG. 5, the coupling portion 22 includes a retaining mechanism 25 configured to retain the torch proximal end 21*p* via the connecting plug 21*c* such that the torch distal end 21*t* is swingable with respect to the coupling portion 22. Further, a retaining rod 25*a* (described later) of the retaining mechanism 25 is attached to the connecting plug 21*c*, and the retaining rod 25*a* extends along the first torch virtual line T1.

An end portion of the retaining rod 25*a* includes a dish-like head portion 25*f*. The head portion 25*f* is housed in a casing 25*h* of the retaining mechanism 25 such that the retaining rod 25*a* is swingable. An axis portion of the retaining rod 25*a* and a portion of the connecting plug 21*c* are covered with a flexible rubber cover 25*c*, together with a lower end portion of the casing 25*h*. This allows the torch distal end 21*t* to be swingable with respect to the casing 25*h*, together with the retaining rod 25*a*.

In the casing 25*h*, a mover 25*d* that abuts on a convex curved surface of the head portion 25*f* of the retaining rod 25*a* is housed. In the casing 25*h*, the mover 25*d* is movably disposed in the longitudinal direction (the direction along the first torch virtual line T1) of the casing 25*h*. In the casing 25*h*, a biasing spring 25*s* that biases the mover 25*d* toward the head portion 25*f* of the retaining rod 25*a* is disposed.

With such a configuration, the torch body 21, together with the retaining rod 25*a*, is retained in the posture illustrated in FIG. 5. When an external force acts on the torch distal end 21*t* of the torch body 21, the retaining rod 25*a* swings and the mover 25*d* that abuts on the convex curved surface of the head portion 25*f* is pushed up, and the biasing spring 25*s* is compressed. At a point in time when the external force acting on the torch distal end 21*t* is released, the mover 25*d* is pushed down by a restoring force of the biasing spring 25*s*, and the torch body 21, together with the retaining rod 25*a*, can return to the posture illustrated in FIG. 5. It is noted that when the mover 25*d* is pushed up to its upper limit, a limit switch 25*p* is actuated and the welding is suspended.

In this manner, it is possible to prevent damage to the torch body 21 caused by the external force acting on the torch distal end 21*t*. It is noted that in the present embodiment, although the retaining mechanism 25 retains the posture of the torch body 21 using the biasing spring 25*s*, the retaining mechanism 25 may swingably retain the posture of the torch body 21 using, for example, a magnetic force of a magnet attached to the portion corresponding to the retaining rod 25*a* and a magnetic force of a magnet attached to the portion corresponding to the mover 25*d*.

It is noted that the axial center of the biasing spring 25*s*, the mover 25*d*, and the retaining rod 25*a* from top in the casing 25*h* includes a through-portion along the first torch virtual line T1. At the time of welding, the welding wire is fed along this through-portion. Further, in the present embodiment, the casing 25*h* of the retaining mechanism 25 is secured to the support arm 14 of the robot body 10 via an L-shaped reinforcement angle 26 and a coupler 27 using fasteners 71, 72, and the like. Specifically, the welding torch 20 is attached to the support arm 14 such that the sixth axis J6 of the support arm 14 and the first torch virtual line T1 are parallel to each other.

4. Regarding the Teaching Handle 40 and the Mounted State Thereof

In the welding robot 1, the teaching handle 40 is a member configured to teach the behavior of the robot body 10 according the position to which the torch distal end 21*t* moves by an external force applied to the end of the robot body 10 from an operator while the teaching handle 40 is held by the operator.

Figure 4:
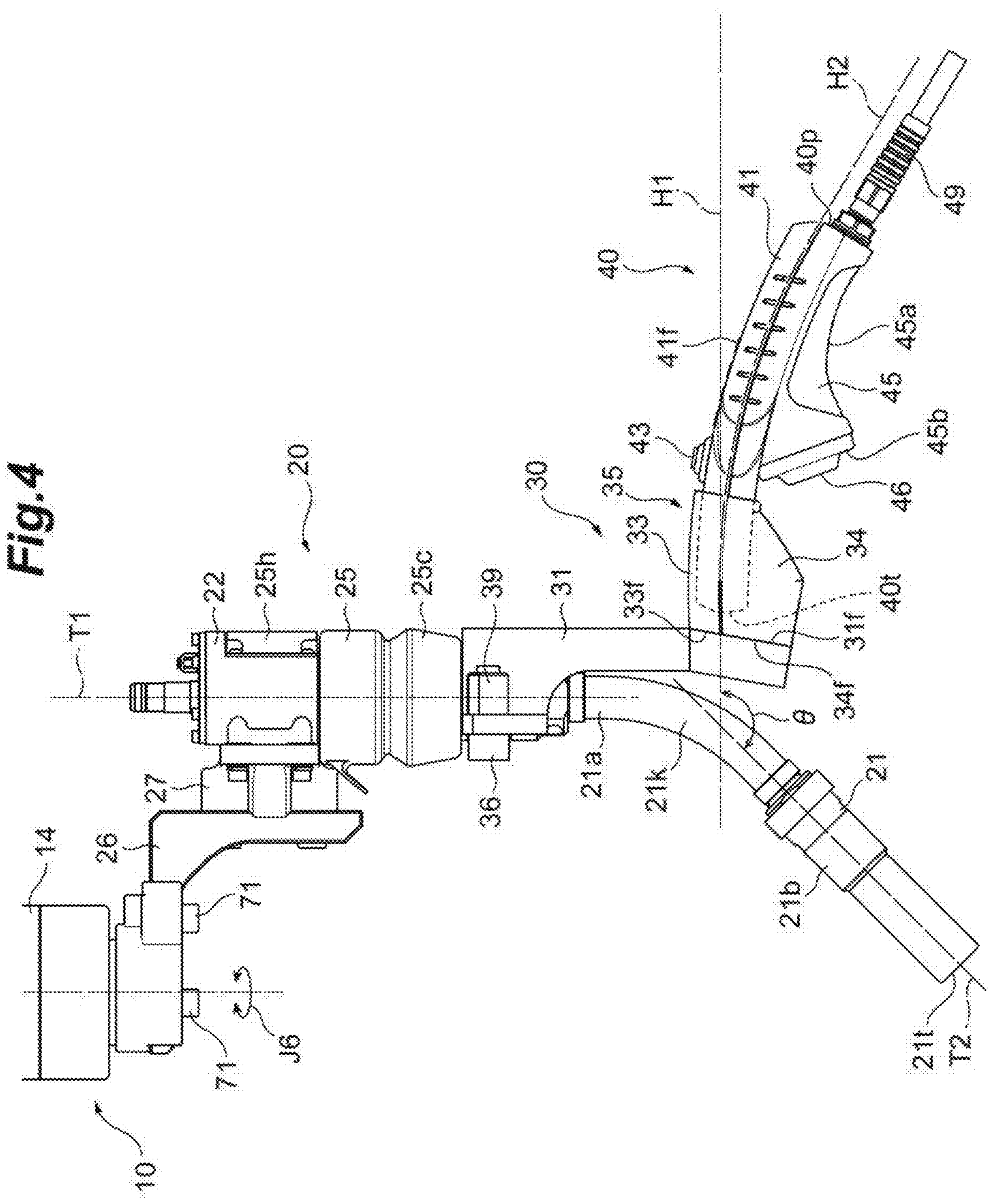
FIG. 4 is a side view of the welding robot illustrated in FIG. 3.

As illustrated in FIG. 4, the teaching handle 40 is mounted to the welding torch 20 such that the handle distal end (distal end face) 40*t* is disposed at a position facing the bending portion 21*k* of the torch body 21. Specifically, the teaching handle 40 is removably mounted to the welding torch 20 via the bracket 30. When automatic welding by the welding robot 1 is performed, the teaching handle 40, together with the bracket 30, is removed from the welding torch 20 except a fixing plate 36.

Here, as illustrated in FIG. 4, the torch body 21 and the teaching handle 40 are viewed from a side in a state where the teaching handle 40 is supported by a handle support portion 35. In this side view of the torch body 21 and the teaching handle 40, with the first torch virtual line T1 along the first portion 21*a* of the torch body 21 from the torch proximal end 21*p* to the bending portion 21*k* interposed therebetween, the teaching handle 40 extends in a direction away from the second portion 21*b* of the torch body 21 from the bending portion 21*k* to the torch distal end 21*t*.

Figure 7:
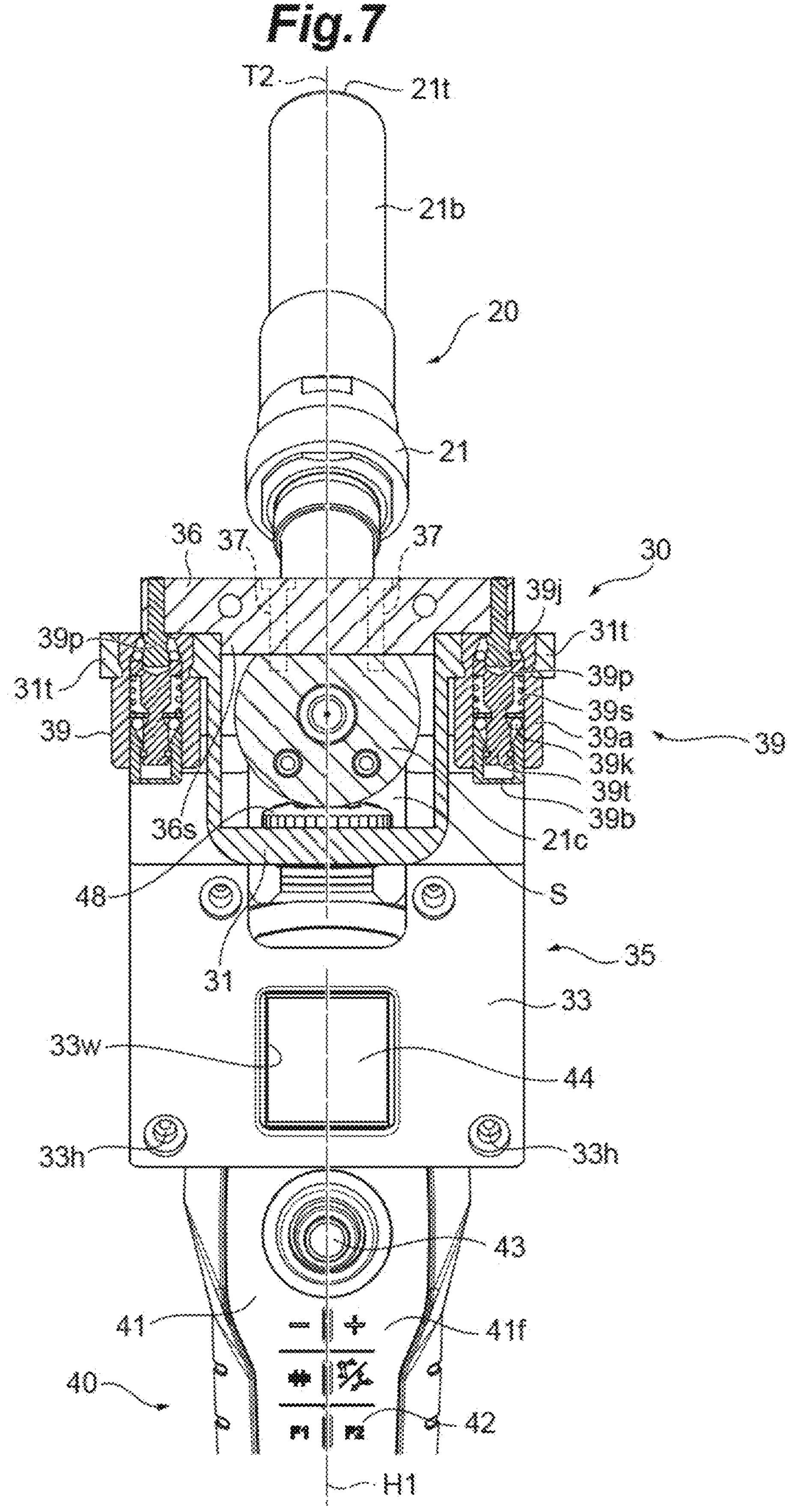
FIG. 7 is a cross-sectional view taken along line A-A illustrated in FIG. 5.

Specifically, a handle mounting angle θ is an obtuse angle, which is formed between the second torch virtual line T2 along the second portion 21*b* of the torch body 21 from the bending portion 21*k* to the torch distal end 21*t* and the first handle virtual line H1 along the direction in which the teaching handle 40 extends from the handle distal end 40*t*. The handle mounting angle θ is preferably in a range from 110° to 140°. As clearly seen in FIG. 4, in the side view of the teaching handle 40, the teaching handle 40 is curved downward from the handle distal end 40*t* toward the handle proximal end 40*p*. Specifically, the teaching handle 40 is curved along the arc-shaped second handle virtual line H2 from the handle distal end 40*t* toward the handle proximal end 40*p*, and the straight line-shaped first handle virtual line H1 corresponds to a tangent to the second handle virtual line H2 at the handle distal end 40*t*. It is noted that in top view, as illustrated in FIG. 7, the first handle virtual line H1 and the second handle virtual line H2 are lines running through the center of the teaching handle 40 in the width direction and exist on a virtual plane identical to the second torch virtual line T2.

In the present embodiment, the teaching handle 40 includes a handle body 41 and a raised portion 45. The handle body 41 extends along the second handle virtual line H2 from a position facing the bending portion 21*k* of the torch body 21. The handle body 41 is a block-like (stick-like) portion curved in side view, and an upper surface 41*f* of the handle body 41 is a curved surface that is curved parallel to the second handle virtual line H2. Since the teaching handle 40 is curved downward, the operator can easily hold the teaching handle 40 and the operability of the teaching handle 40 can be improved. With the raised portion 45, over which the fingers of the operator, from a middle finger F3, a ring finger F4, to a little finger F5, are placed, the holding property of the teaching handle 40 can be improved. Thus, the operability of the teaching handle 40 can further be improved.

Figure 3:
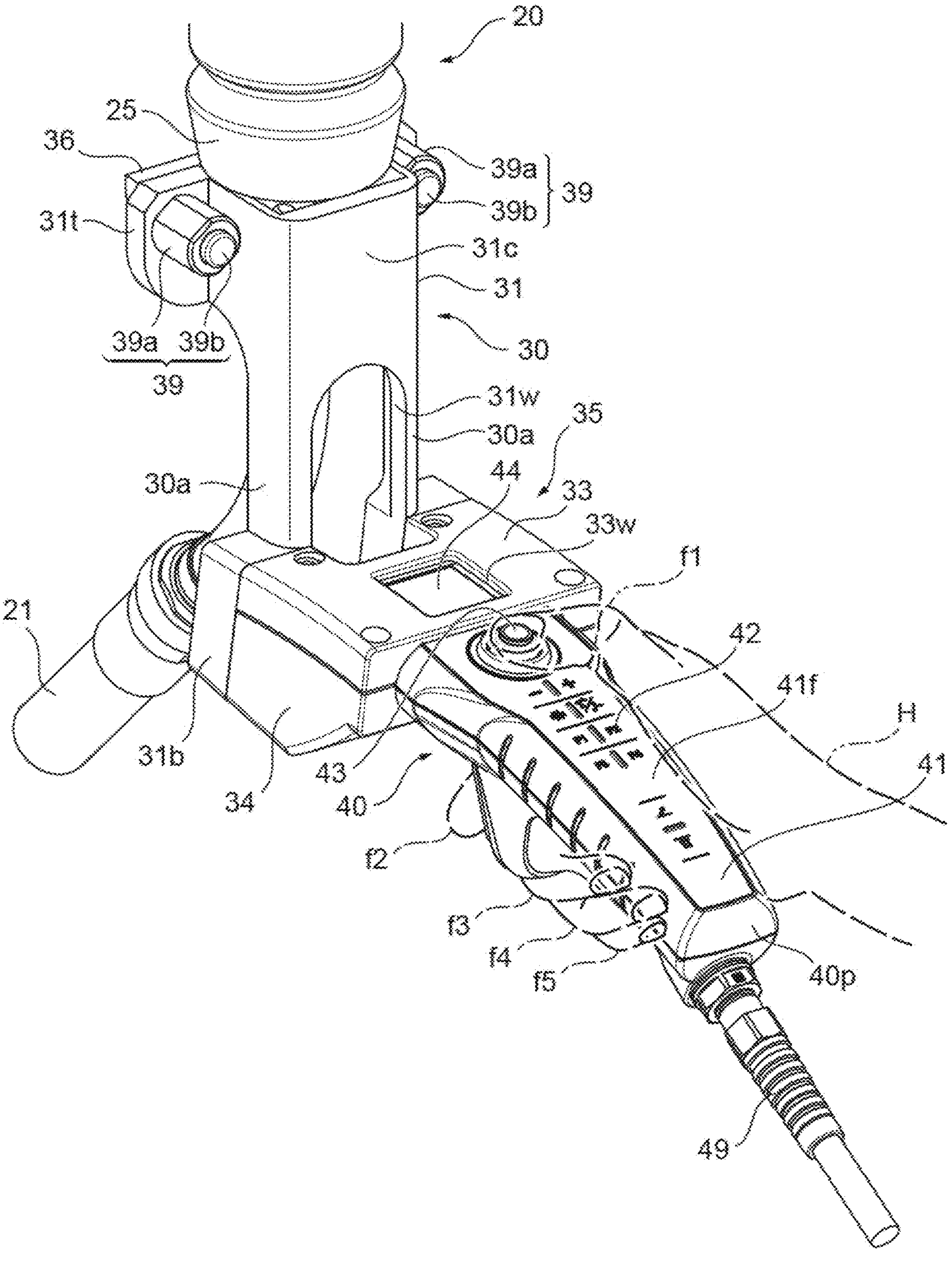
FIG. 3 is a schematic perspective view of the welding robot illustrated in FIG. 1 in a state where a teaching handle is mounted.

As illustrated in FIG. 3, on the upper surface 41*f* of the handle body 41, a display panel 44, a function lever 43, and a plurality of function buttons 42, and the like are arranged in this order from the handle distal end 40*t* side. A stop button 48 is attached on the end face of the handle distal end 40*t*.

The function button 42 is a changeover switch to select (a) a manual welding mode by the operator (worker), (b) a first teaching mode for teaching a welding behavior of the robot body 10 by the external force by the operator (worker), (c) a second teaching mode for teaching a welding behavior of the robot body 10 by sending an operation signal to the robot body 10 according the operation of the function lever 43 or the like by the operator (worker) to manipulate the robot body 10, and the like. On the display panel 44, the state of the robot body 10 including these modes and the like are displayed. Further, the stop button 48 is used to force the welding robot 1 to stop in an emergency or the like. Signals outputted in response to the operator operating the function button 42 and the function lever 43 are transmitted to the above-described control device via a cable 49 connected to the handle proximal end 40*p* of the teaching handle 40.

Further, the teaching handle 40 includes the raised portion 45 that is raised from the lower part of the handle body 41. The raised portion 45 serves as a finger hook portion over which the fingers of the operator are placed in a state where the operator is holding the teaching handle 40. The raised portion 45 has a height from the handle body 41 that becomes smaller from the handle distal end 40*t* side toward the handle proximal end 40*p* side.

An operation switch 46 is disposed on an end face 45*b* of a surface 45*a* of the raised portion 45, which is nearer to the handle distal end 40*t*. The operation switch 46 is a switch that allows movableness of the robot body 10 by the external force with respect to the robot body 10 with the restricted movableness. Since the operation switch 46 is disposed on the end face of the surface of the raised portion 45 nearer to the handle distal end 40*t*, the operator can easily press the operation switch 46 with an index finger F2 while placing the fingers from the middle finger F3 to the little finger F5 over the raised portion 45.

Here, specifically, the above-described first to sixth motors are attached to the robot body 10, and the first to sixth motors are mechanically or electrically locked in a state where the operation switch 46 is not pressed (OFF state). In a state where the operation switch 46 is pressed (ON state), the mechanical or electrical locks of the first to sixth motors are released. Here, the unlocking may be set to continue by continually pressing the operation switch 46, or the locking and the unlocking may be set to be switched by pressing the operation switch 46 once. Thus, the restriction (lock) on the movableness of the robot body 10 is released, and the movableness of the robot body 10 is allowed.

5. Regarding the Bracket 30

Figure 6:
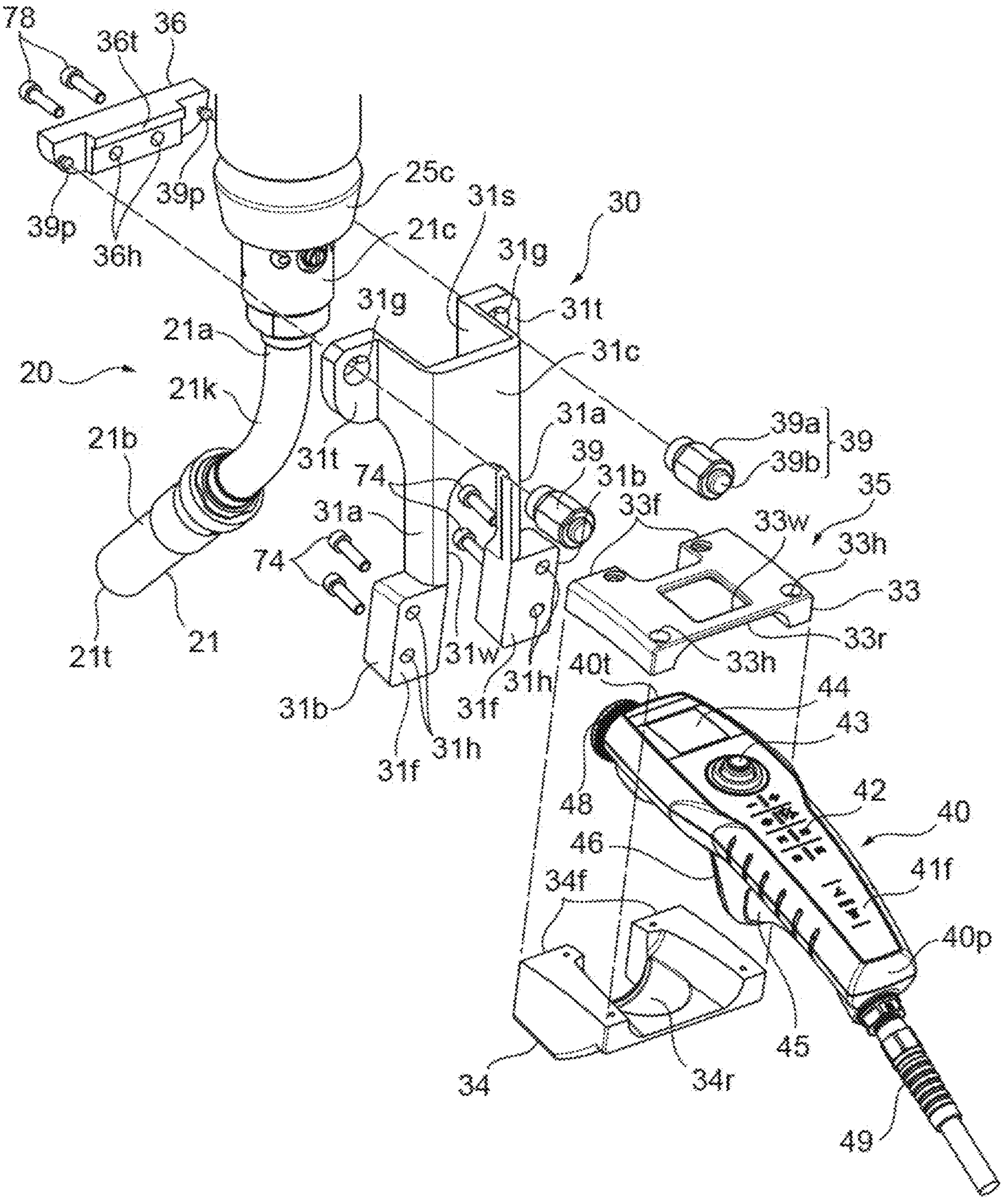
FIG. 6 is an exploded perspective view of the welding robot illustrated in FIG. 2.

As illustrated in FIG. 3 and FIG. 6, the bracket 30 includes a bracket body 31 configured to be detachably secured to the connecting plug 21*c* of the welding torch 20, and a handle support portion 35, continuous to the bracket body 31, configured to support the teaching handle 40 to the welding torch 20. The bracket body 31 is provided in parallel to the first portion of the torch body 21 from the torch proximal end 21*p* to the bending portion 21*k*, with a distance therefrom.

In the present embodiment, to the connecting plug 21*c*, the fixing plate 36 made of insulating resin such as polyolefin resin as an electrically insulating material is secured. As illustrated in FIG. 6, the fixing plate 36 includes a pair of through-holes 36*h* and is attached to the connecting plug 21*c* of the welding torch 20 by a pair of fasteners 78. The fixing plate 36 includes at its center a protrusion 36*t* to be engaged with a recess of the connecting plug 21*c*. A pair of locking pins 39*p* to be locked into attaching and detaching members 39 is raised on the horizontally opposite sides of the fixing plate 36.

The bracket body 31 is a metal portion made of a metal material such as aluminum or stainless steel, for example. The bracket body 31 is secured to the fixing plate 36 to surround the connecting plug 21*c* in a state where the bracket body 31 is not in contact with the connecting plug 21*c*. The bracket body 31 includes, from the side nearer to the teaching handle 40, a cover portion 31*c* surrounding the connecting plug 21*c* along the first torch virtual line T1 and a pair of flange portions 31*t* formed on the opposite sides of the cover portion 31*c*. Each flange portion 31*t* is provided with a through-hole 31*g* through which the attaching and detaching member 39 is inserted.

Consequently, as illustrated in FIG. 7, a space S can be formed between the bracket body 31 (or the cover portion 31*c* thereof) and the connecting plug 21*c*. In the present embodiment, since the bracket body 31 is secured to the resin fixing plate 36 to surround the connecting plug 21*c* in a state where the bracket body 31 is not in contact with the connecting plug 21*c*, it is possible to ensure the electrical insulation between the connecting plug 21*c* and the bracket body 31. This can avoid direct contact of the operator with the welding torch 20 and can ensure the electrical insulation between the welding torch 20 and the teaching handle 40.

The bracket body 31 is detachably secured to the connecting plug 21*c* via the fixing plate 36 secured to the connecting plug 21*c* by the attaching and detaching member 39 with a push button 39*b*. The attaching and detaching member 39 is configured to release the retained state between the fixing plate 36 and the bracket body 31 by a push on the push button 39*b*. The attaching and detaching member 39 is attached to the bracket body 31 and to the fixing plate 36 such that the direction in which the push button 39*b* is to be pushed is equal to the direction in which the bracket body 31 is to be pushed to the fixing plate 36.

Examples of the attaching and detaching member 39 may include an attaching and detaching member that is a so-called 1-way clamper. Specifically, as illustrated in FIG. 7, the attaching and detaching member 39 includes a cylindrical housing 39*a*. In the housing 39*a*, a moving body 39*t* that is movable along the axial direction of the housing 39*a* and a biasing spring 39*s* that biases the push button 39*b* are housed. The moving body 39*t* has a bottleneck shape at the center in the axial direction. The push button 39*b* slidably covers the moving body 39*t*, and on the end face of the push button 39*b*, a plurality of sliding balls 39*k* that lead in the moving body 39*t* are arranged around the axis. Further, in the housing 39*a*, a plurality of locking balls 39*j* retained on a locking pin 39*p* are arranged around the axis on the distal end side of the moving body 39*t*.

When the bracket body 31 is attached to the fixing plate 36, each flange portion 31*t* of the bracket body 31 is allowed to abut on the fixing plate 36, and the locking pin 39*p* provided on the fixing plate 36 is inserted into the housing 39*a* of the attaching and detaching member 39 such that the locking balls 39*j* are retained on the locking pin 39*p*. Accordingly, the bracket body 31 is attached to the connecting plug 21*c* via the fixing plate 36 secured to the connecting plug 21*c* by the attaching and detaching member 39.

Meanwhile, when the bracket body 31 is detached from the fixing plate 36, the push button 39*b* is pushed, whereby the sliding balls 39*k* enter the bottleneck of the moving body 39*t*. In this state, when the push on the push button 39*b* is released, the push button 39*b* returns to its original position by a restoring force of the biasing spring 39*s*, and the sliding balls 39*k* and the moving body 39*t* are led into the push button 39*b*. At this time, the retained state between the locking pin 39*p* and the locking balls 39*j* is released. Accordingly, the bracket body 31 can be detached from the fixing plate 36 secured to the connecting plug 21*c*.

As described above, according to the present embodiment, the attaching and detaching member 39 is attached to the bracket body 31 and to the fixing plate 36 such that the direction in which the push button 39*b* of the attaching and detaching member 39 is to be pushed is equal to the direction in which the bracket body 31 is to be pushed to the fixing plate 36. Accordingly, from the state illustrated in FIG. 3, while the operator is holding the teaching handle 40 with one hand H on the front side of the operator, a push on the push button 39*b* from the bracket body 31 side toward the fixing plate 36 with a finger of the other hand of the operator allows releasing the retained state by the attaching and detaching member 39. When the teaching handle 40 is pulled toward the operator in a state where the push button 39*b* is pushed, the teaching handle 40 can easily be removed from the welding torch 20 together with the bracket body 31.

Further, in the present embodiment, the bracket body 31 includes a pair of arms 31*a*. Specifically, the arms 31*a* extend from the opposite sides of the cover portion 31*c* so as to be provided in parallel to the first portion 21*a* of the torch body 21 from the torch proximal end 21*p* to the bending portion 21*k*. Accordingly, when the torch body 21 is viewed from the teaching handle 40 side, the bracket body 31 includes an opening 31*w* in which the first portion 21*a* of the torch body 21 from the torch proximal end 21*p* to the bending portion 21*k* is exposed. This allows visual recognition of the first portion 21*a* and the second portion 21*b* of the torch body 21 when a manual welding operation and a teaching operation are performed. Consequently, it is possible to accurately perform manual welding and accurately teach the welding behavior to the robot body 10 while visually recognizing the torch body 21. Furthermore, the opening 31*w* allows the worker's finger to pass therethrough to press the stop button 48.

The handle support portion 35 is a portion made of insulating resin such as polyolefin resin, configured to support the teaching handle 40 such that the handle distal end 40*t* of the teaching handle 40 is disposed at the position facing the bending portion 21*k*. In the present embodiment, the handle support portion 35 is made up of an upper clamp member 33 and a lower clamp member 34 (a pair of clamp members 33, 34) configured to sandwich the portion of the teaching handle 40 near the distal end.

In the present embodiment, the distal end (lower end) of each arm 31*a* of the bracket body 31 includes an abutting portion 31*b* that abuts on the upper and lower clamp members 33, 34. The abutting portion 31*b* includes an abutting surface 31*f* that faces the teaching handle 40 and abuts on end faces 33*f*, 34*f* of the upper and lower clamp members 33, 34. The abutting portion 31*b* includes an insertion hole 31*h* through which a fastener 74, such as a bolt, to be tightened to the upper and lower clamp members 33, 34, is inserted. Each of the upper clamp member 33 and the lower clamp member 34 is fastened by the fastener 74, which is inserted through the insertion hole 31*h* from the torch body 21 side, thereby being attached to the abutting portion 31*b* of the bracket body 31.

As illustrated in FIG. 4, in side view, the abutting surface 31*f* of the abutting portion 31*b* and the end faces 33*f*, 34*f* of the pair of upper and lower clamp members 33, 34 that abut on the abutting surface 31*f* of the abutting portion 31*b* are inclined with respect to the first torch virtual line T1. Accordingly, it is possible to prevent a shearing force from acting on a thread portion of the fastener 74 toward the direction perpendicular to the axial direction of the fastener 74, caused by the external force vertically applied from the teaching handle 40 by the operator.

The upper clamp member 33 and the lower clamp member 34 respectively include recesses 33*r*, 34*r* in accordance with the teaching handle 40. When the teaching handle 40 is mounted, the teaching handle 40 is vertically sandwiched between the upper clamp member 33 and the lower clamp member 34, then fasteners (not illustrated) are inserted through four through-holes 33*h* of the upper clamp member 33, and the fasteners are tightened to the lower clamp member 34. This allows the teaching handle 40 to be held with respect to the welding torch 20 via the bracket 30. Since the upper and lower clamp members 33, 34 are made of resin, it is possible to ensure the electrical insulation between the connecting plug 21*c* and the teaching handle 40. Further, the upper clamp member 33 includes an open window 33*w* having a shape in accordance with the display panel 44. The operator can perform operations with the teaching handle 40 while checking the display panel 44 through the open window 33*w*.

6. Regarding Manual Welding and Teaching

The following describes the manual welding using the welding robot 1 and the teaching of the welding robot in the automatic welding, together with their effects. For example, in the case of manual welding, (a) the operator (worker) sets the manual welding mode using the function button 42. When the operator presses the operation switch 46 once, the mechanical or electrical locks of the first to sixth motors are released. With this, while holding the teaching handle 40, the operator moves the torch distal end 21*t* of the torch body 21 along the welding line while changing the posture of the robot body 10 by the external force (the operating force) from the teaching handle 40 in accordance with the welding behavior. Specifically, the above-described control device controls the driving of the first to sixth motors of the robot body 10 corresponding to the signals detected by the above-described torque sensors on the axes attached to the robot body 10 or force sensors (not illustrated) that measure respective three-dimensional forces applied to the end of the robot body 10, and the like by the external force from the teaching handle 40.

As described above, at the time of welding behavior of the robot body 10 while manipulating the robot body 10 by the external force, with another press of the operation switch 46 with the index finger F2, a welding wire (not illustrated) is fed while melting the wire with an arc discharge generated from the tip of the welding wire located at the torch distal end 21*t*. This allows the operator (worker) to perform manual welding using the welding robot 1. Note that in the present embodiment, although the operation switch 46 is used to release the lock of the robot body 10 and to execute the welding behavior (welding by the arc discharge), the process is not limited to this. Use of at least one of the function button 42 or the function lever 43 may be set. For example, a continual press of the operation switch 46 with the index finger F2 may release the restriction (lock) on the movableness of the robot body 10, and when the welding behavior is executed, at least one of the function button 42 or the function lever 43 may be operated with a thumb F1, for example.

For example, in teaching, when (b) the operator (worker) sets the first teaching mode using the function button 42, the mechanical or electrical unlocking of the first to sixth motors is continued while the operation switch 46 is continually pressed. With this, while holding the teaching handle 40, the operator continually presses the operation switch 46, and moves the torch distal end 21*t* of the welding torch 20 along the welding line while changing the posture of the robot body 10 by the external force (operating force) from the teaching handle 40 in accordance with the welding behavior. Specifically, as described above, the above-described control device controls the driving of the first to sixth motors of the robot body 10 corresponding to the signals detected by the above-described torque sensors or force sensors, and the like by the external force from the teaching handle 40. At this time, rotation positions of the first to sixth motors are calculated by the detection signals of encoders (not illustrated) of the first to sixth motors. This allows teaching the welding behavior of the robot body 10 by the operator.

For example, in teaching, when (c) the operator (worker) sets the second teaching mode using the function button 42, teaching may be performed in the same manner as the teaching using a commonly known teaching pendant by operating the function lever 43 or the like by the operator. Therefore, detail description will be omitted.

Note that although the first to sixth motors are mechanically or electrically locked in a state where the above-described operation switch 46 is pressed (ON state), for example, the locked state of the motor that need not be driven, such as the first motor, may be maintained, in accordance with the posture of the articulated robot in teaching.

According to the present embodiment, in a state where the operator is holding the teaching handle 40, it is possible to apply the external force from the teaching handle 40 to the end of the robot body 10, and teach the behavior of the robot body 10 according to the position to which the torch distal end 21*t* moves. Further, the teaching handle 40 is mounted to the welding torch 20 such that the handle distal end 40*t* is disposed at a position facing the bending portion 21*k*, and, with the first torch virtual line T1 interposed therebetween, the teaching handle 40 extends in a direction away from the second portion 21*b* of the torch body 21 from the bending portion 21*k* to the torch distal end 21*t*. Accordingly, in the teaching operation, the operator holds the teaching handle 40 such that the handle distal end 40*t* is located on the front side of the operator and moves the handle distal end 40*t* of the holding teaching handle 40, whereby the torch distal end 21*t* of the torch body 21 can be moved precisely and smoothly.

Figure 8A:
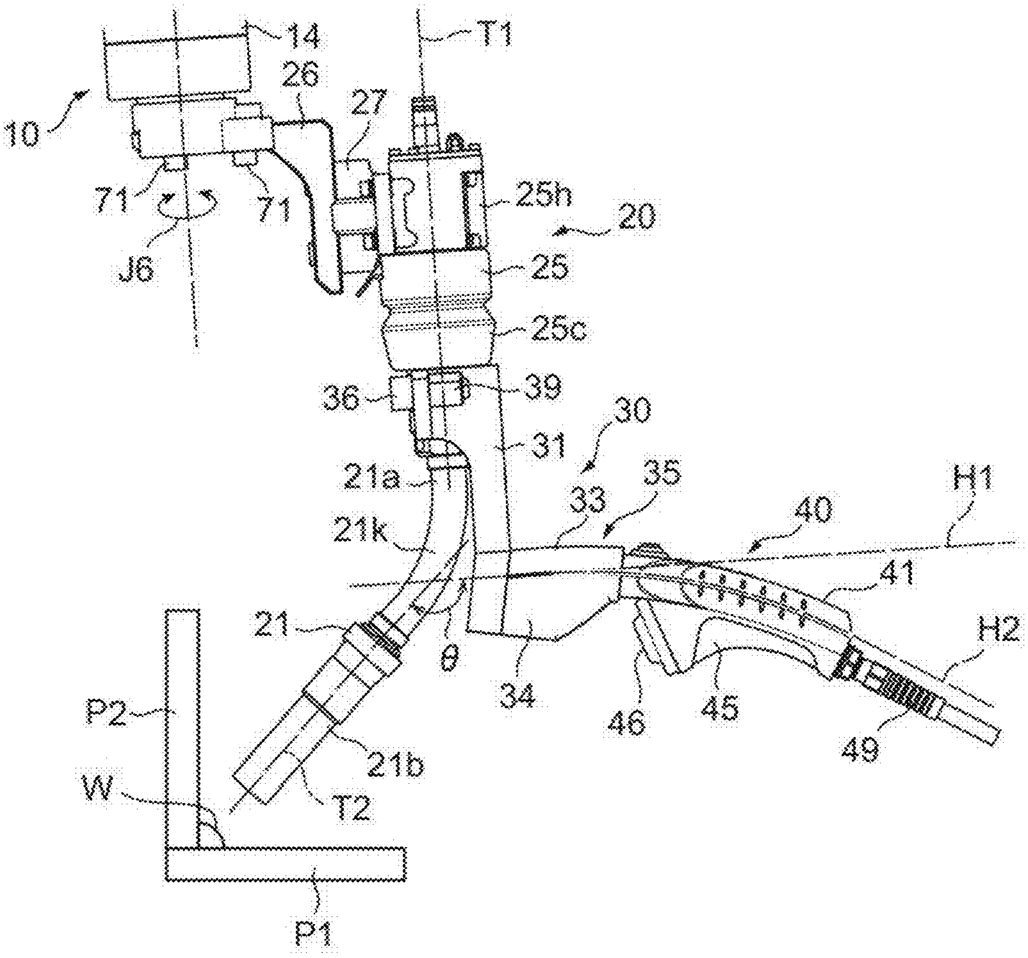
FIG. 8A is a side view for describing a teaching operation by the welding robot illustrated in FIG. 4.
Figure 8B:
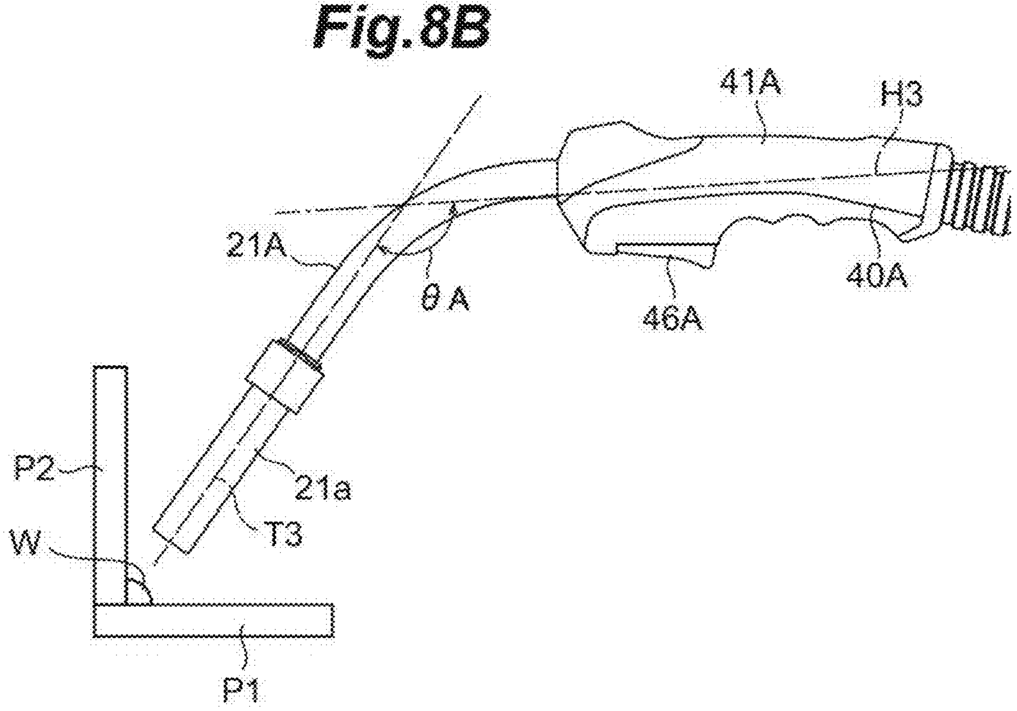
FIG. 8B is a side view for describing a welding operation by a handle type welding torch.

In particular, as illustrated in FIG. 8A, since the handle mounting angle θ formed between the second torch virtual line T2 and the first handle virtual line H1 is an obtuse angle, the arrangement of the torch body 21 and the teaching handle 40 is close to the arrangement of a handle type torch body 21A for manual welding and a handle 41A illustrated in FIG. 8B. That is, an angle θA formed between a torch virtual line T3 of the torch body 21A and a handle virtual line H3 of a handle 40A (handle body 41) is close to the handle mounting angle θ illustrated in FIG. 8A. In addition, also the position of the operation switch 46 of the teaching handle 40 is close to the position of an operation switch 46A of the handle 41A, and thus the worker can press the operation switch 46 with an index finger.

As described above, since welding similar to the behavior of the worker performing welding can be performed by the welding robot 1 in the manual welding, it is possible to form an accurate welded portion W by the manual welding with respect to members P1, P2 being welded. Further, in teaching, since it is possible to teach a behavior similar to the behavior of the worker performing welding to the welding robot 1, it is possible to form an accurate welded portion W by automatic welding with respect to the members P1, P2 being welded. In particular, when the handle mounting angle is in a range from 110° to 140°, the arrangement of the torch body 21 and the teaching handle 40 is close to the arrangement of the handle type torch body 21A and the handle 40A, and thus such an effect can be produced more readily.

Furthermore, in the present embodiment, by using the above-described bracket 30, in the manual welding operation and the teaching operation, the operator (worker) holds the teaching handle 40 such that the handle distal end 40*t* is located on the front side of the operator. Further, by moving the handle distal end 40*t* of the holding teaching handle 40, the operator can precisely and smoothly move the torch distal end 21*t* of the torch body 21. In particular, by disposing the torch body 21 and the teaching handle 40 such that the first handle virtual line H1 and the second torch virtual line T2 are on the same virtual plane, such an effect can be produced more readily.

Further, the bracket body 31 is detachably secured to the connecting plug, and the bracket body 31 is provided in parallel to the first portion of the torch body 21 from the torch proximal end 21*p* to the bending portion 21*k* with a distance therefrom. Accordingly, the operator's force acts from the teaching handle 40 on the connecting plug 21*c* via the bracket body 31. Thus, even when the teaching handle 40 is mounted in the vicinity of the bending portion 21*k* of the torch body 21, it is possible to perform manual welding and accurately teach the welding behavior to the robot body 10 while suppressing swing of the torch distal end 21*t*.

Although the embodiment of the present invention has been described in detail above, the present invention is not limited to the foregoing embodiment, and various design changes are possible in so far as they are within the spirit of the present invention in the scope of the claims.

What is claimed is:

1. A welding robot comprising:

a robot body with multiple joints; and a welding torch attached to an end of the robot body, the welding torch being configured to guide a welding wire therethrough, wherein the welding torch includes a tubular torch body and a coupling portion that couples the tubular torch body to the end of the robot body, the tubular torch body including a first portion extensive along a linear first torch virtual line and a second portion extensive along a linear second torch virtual line that intersects with the linear first torch virtual line, wherein the tubular torch body further includes a bending portion disposed between a torch proximal end of the torch body and a torch distal end of the torch body, the bending portion connecting the first and second portions to form the tubular torch body in a continuously extending tubular shape, wherein the welding robot further includes a teaching handle having a handle distal end and a handle proximal end, and configured to teach a behavior of the robot body according to a position to which the torch distal end moves by an external force applied to the end of the robot body from an operator while the teaching handle is held by the operator, wherein the teaching handle is removably mounted to the welding torch such that the handle distal end of the teaching handle is disposed at a position facing the bending portion, wherein in side view of the torch body and the teaching handle, the teaching handle extends at a handle mounting angle in a direction away from the second portion of the torch body from the bending portion to the torch distal end, wherein the handle mounting angle is an obtuse angle formed between the second linear torch virtual line extending from the bending portion to the torch distal end and a linear first handle virtual line along which the teaching handle extends from the handle distal end, and wherein in side view of the teaching handle, the teaching handle extends concave down along an arcuate second handle virtual line from the handle distal end toward the handle proximal end, the linear first handle virtual line being unaligned with either the linear first torch virtual line or the linear second torch virtual line and extending tangentially to the arcuate second handle virtual line.

2. The welding robot according to claim 1, wherein the handle mounting angle measures in a range from 110° to 140°.

3. The welding robot according to claim 1, wherein in side view of the teaching handle, the teaching handle extends concave down.

4. The welding robot according to claim 1, wherein the teaching handle comprises:

a handle body extending from a position facing the bending portion; and a raised portion for a finger hook over which fingers of an operator are placed in a state where the operator holds the teaching handle, the raised portion being raised from a lower part of the handle body, wherein the raised portion has a height from the handle body that becomes smaller from a handle distal end side toward a handle proximal end side.

5. The welding robot according to claim 4, wherein the teaching handle includes an operation switch operable to allow the robot body to move in response to the external force and otherwise restrict movement of the robot body, and wherein the operation switch is disposed on an end face of a surface of the raised portion nearer to the handle distal end.

* * * * *